Patented Aug. 20, 1940

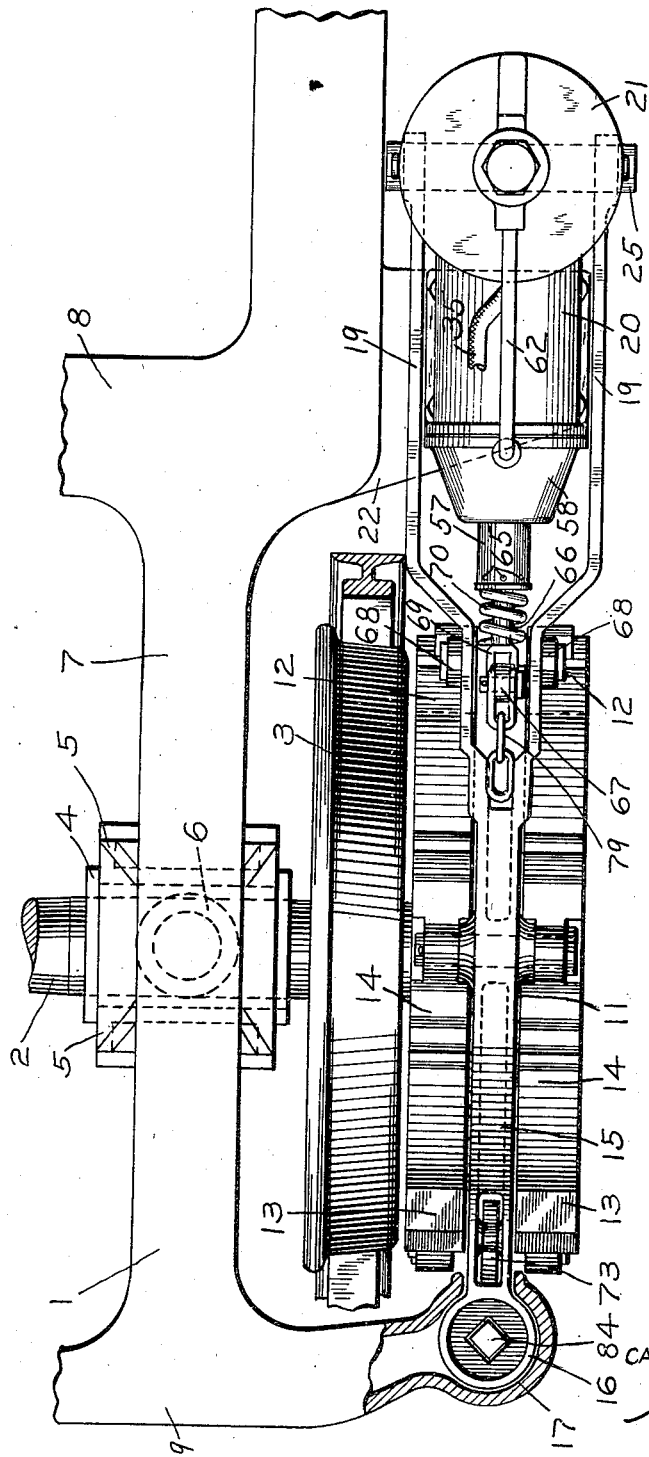

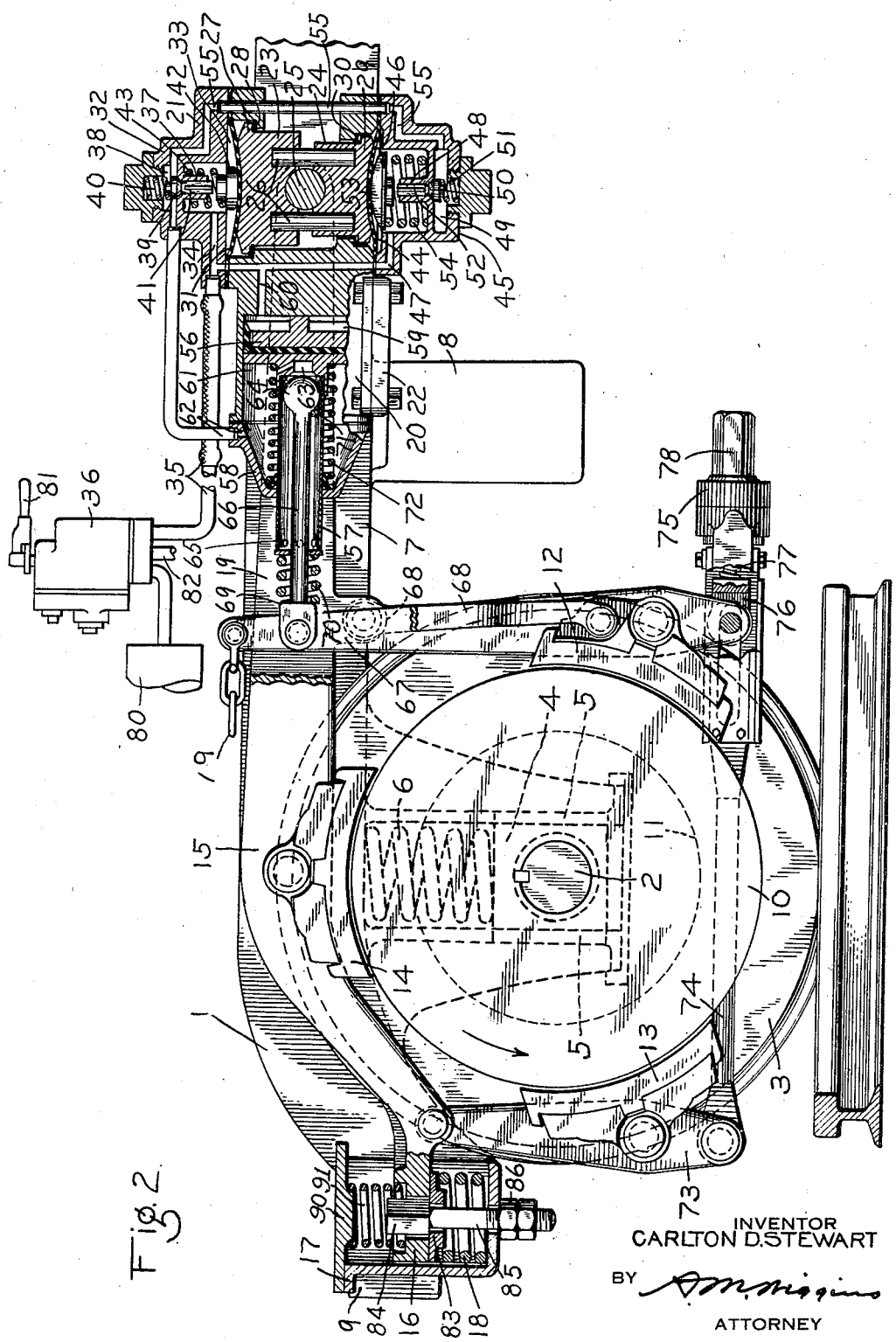

2,212,408

UNITED STATES PATENT OFFICE 2,212,408

BRAKE MEANS

Carlton D. Stewart, Wilkinsburg, Pa., assignor to The Westinghouse Air Brake Company, Wilmerding, Pa., a corporation of Pennsylvania Application June 24, 1939, Serial No. 280,923

33 Claims. (Cl. 188—181)

This invention relates to brake mechanisms for railway vehicle trucks and more particularly to that type of brake mechanism disclosed in my prior pending application for U. S. Letters Patent, Serial No. 214,517, filed June 18, 1938, now Patent No. 2,177,953, dated Oct. 31, 1939, in which, in effecting an application of the brakes, downwardly directed forces set up in the mechanism upon the frictional braking engagement of two or more brake elements or shoes with a wheel and axle assembly of the truck will be transmitted through the medium of another brake element or shoe to the assembly instead of to the truck frame.

The principal object of the present invention is to provide a brake mechanism of the above mentioned type with brake control means responsive to torque exerted on one or more of the brake elements, due to braking, for controlling the force with which the elements are pressed into braking engagement with an individual wheel and axle assembly so as to regulate the braking effect according to any one of various different values which the operator may select through the operation of a brake valve device or any other desired control apparatus, so as to prevent unwanted locking of the vehicle wheels and the consequent sliding thereof under normal conditions of adhesion between the wheels of the assembly and the track rails.

This object is attained by the use of a torque responsive mechanism wherein the torque exerted on at least one of the friction brake elements, when an application of the brakes is being effected, is opposed by a force which varies according to the various degrees of braking which the operator may select and wherein the braking force of the brake mechanism will be limited or reduced when the torque force thereon becomes sufficient to overpower the opposing force. By thus varying the force resisting the torque force on the brake elements according to the selection by the operator of the desired braking effect, it is possible to automatically regulate the braking effect on each individual wheel and axle assembly to any one of numerous different degrees dependent upon the degree of braking effect which is selected by the operator. This automatic regulation of the braking effect is intended to prevent the locking of the vehicle wheels and the consequent sliding thereof under normal conditions of adhesion between the wheels of the assembly and the track rails, and also to insure that each wheel and axle assembly will contribute its proper share of the total braking effort.

The brake mechanism disclosed in the above mentioned pending application is of the clasp type and comprises a single brake cylinder and a single system of operatively connected levers and rods for actuating the clasp arranged brake shoes into and out of braking engagement with a wheel and axle assembly of the truck, and further comprises a brake carrier which normally supports the system from the truck frame and which is actuated by said system, when an application of the brakes is initiated, to move another brake shoe into engagement with the wheel and axle assembly to assist in opposing rotation of the assembly and to support the greater portion of the load imposed on the system by the clasp arranged brake shoes while such shoes are in frictional braking engagement with the wheel and axle assembly. Since the torque transmitted to at least one of the clasp arranged brake elements acts through the brake carrier and therefore on the brake element carried thereby to increase the braking pressure on the element, it is possible that, as the coefficient of friction between the brake elements and the cooperating braking surface on the wheel and axle assembly increases due to a reduction in the rotative speed of the assembly or for any other reason, the braking effect may be increased to such an extent as to cause the wheels to slide on the track rails. It is therefore another object of the invention to provide means whereby the torque transmitted to the brake carrier when sufficient to overcome an opposing force acting on the carrier which varies according to the degree of braking effect selected by the operator will act to limit or decrease the braking force applied to the brake elements.

A further object of the invention is to provide means operative by the brake carrier of a brake mechanism of the above mentioned type in response to torque transmitted to the carrier for controlling the braking force aplied to the friction brake elements as to regulate the braking effect on the wheel and axle assembly to a selected degree.

When a vehicle is in motion and an application of the brakes is initiated, the momentum of the body thereof has a tendency to cause the truck to tilt forwardly, with the result that the adhesion between the rear truck wheels and the track rails will be unintentionally decreased so that these wheels, when being braked, will be more liable to slide on the rails than will the front truck wheels. With this in mind the brake arrangement disclosed in aforementioned pending application has been so designed and arranged that the total braking force of the three brake elements on the rear wheels of the truck for a given brake cylinder pressure will be less than that of the corresponding brake elements on the front wheels, thereby lessening the liability of sliding the rear wheels on the rails. From this it will be understood that since the brake mechanisms for the front and rear wheel and axle assemblies are identical the brake mechanism for each assembly is such that it will produce heavier braking when the assembly is rotating in one direction than it will when the assembly is rotating in the opposite direction.

With this in mind it is another object of the invention to provide a brake mechanism of the above mentioned type with control means, which, for any chosen brake cylinder pressure, will respond to a certain torque on the mechanism, when the wheel and axle assembly is rotating in one direction, to regulate the braking effect of the mechanism, and which will respond to a lesser torque when the wheel and axle assembly is rotating in the opposite direction, to also regulate the braking effect of the mechanism to the same degree.

According to this object the control means will function in response to the different degrees of torque exerted on the brake mechanism according to the direction of rotation of the wheel and axle assembly to provide the proper braking.

Other objects and advantages will appear in the following more detailed description of the invention.

In the accompanying drawings, Fig. 1 is a plan view of a portion of a railway vehicle truck and brake rigging embodying the invention and Fig. 2 is a side elevational view of the same, portions of the truck frame and brake mechanism being shown in section. There is also shown in Fig. 2 a control apparatus including a brake valve and a fluid pressure supply reservoir.

For illustrative purposes the invention is shown embodied in a four wheel railway vehicle truck of the type having a cast metal truck frame 1, and the usual longitudinally spaced wheel and axle assemblies, each of which assemblies may comprise an axle 2 and laterally spaced wheels 3 which may be secured in any desired manner to the axle for rotation therewith.

Between the wheels and at each side of the truck the axle of each wheel and axle assembly is suitably journaled in journal bearings 4 which are loosely mounted between spaced downwardly depending pedestal jaws 5 preferably formed integral with the truck frame. The truck frame is resiliently supported from each end of each wheel and axle assembly by a spring 6 for vertical movement relative to the assembly, the spring in the present embodiment of the invention being seated on the adjacent journal bearing. The truck frame differs somewhat from the conventional type of frame in that each side member 7 thereof is inset or recessed opposite each wheel to accommodate the wheel, and in that the pedestal jaws between which the journal bearings 4 are mounted, are disposed inboard of the wheels. The side members of the frame may be integrally connected together in the usual manner by transversely extending transoms 8 and transversely extending end pieces 9.

It will here be understood that each wheel and axle assembly may be provided with two of the brake mechanisms hereinafter fully described and that both of these mechanisms may be substantially identical with each other in construction and arrangement and may operate independently of each other and will have substantially the same operating characteristics. In view of this only one such brake mechanism, one end of a wheel and axle assembly and the necessary portions of the truck frame have been shown in the drawings, and for the sake of simplicity and clearness the following description will be more or less limited to what is shown.

Located outboard of the wheel 3 but adjacent thereto is a brake drum 10 which is secured any desired manner to the outer end of the axle 2 for rotation therewith. This drum is preferably provided with laterally spaced peripheral braking surfaces which are separated by a central peripheral groove 11, but which if desired may be made continuous across the width of the drum. These braking surfaces are adapted to be frictionally engaged by spaced pairs of brake elements 12, 13 and 14 which are radially arranged about the drum, the elements 12 and 13 being located below the horizontal center line of the drum and at opposite sides thereof and the element 14 being located above the drum centrally thereof. It will here be understood that each brake element may comprise the usual brake shoe and brake shoe head and since this combination of head and shoe is well known by those skilled in the brake art, the elements will, for the sake of clearness of description, be hereinafter referred to by either the term brake shoe or brake shoes.

The brake shoes 14 are pivotally carried by a combined brake lever and brake carrier 15 which extends longitudinally of the truck on the outer side of the adjacent truck side member 7 and above the horizontal center line of the drum.

In the present embodiment of the invention the brake carrier 15 is shown provided at its outer end with a substantially circular horizontally disposed spring seat 16 which is loosely mounted to move vertically within a pocket 17 carried by the adjacent end piece 9 of the truck frame and which is resiliently supported by a release spring 18 contained in the pocket and carried by the bottom wall thereof.

Located above the spring 18 and interposed between and operatively engaging the upper side of the spring seat 16 of the carrier 15 and the inner surface of the top cover 90 of pocket 17 is a spring 91 which functions to prevent undue vertical vacillations of the carrier when the truck is in motion and the brakes released.

The inner end portion of the brake carrier comprises laterally spaced vertically disposed longitudinally extending side pieces 19 which straddle a longitudinally extending brake cylinder 20 and a brake controlling valve device 21 rigidly secured to a bracket 22 extending outwardly from the truck side member 7.

The valve device 21 comprises vertically aligned upper and lower followers 23 and 24, respectively, which are slidably guided by the casing of the device for vertical movement relative to each other. Mounted between and engaged by the followers is a transversely extending pin 25, the ends of which pin projects beyond the casing of the device and have rockably mounted thereon the inner end of the side pieces 19 of the brake carrier. The inner ends of the followers are spaced apart from each other a short distance, and bridging this space and loosely mounted in the followers in parallel relation to each other are two spaced vertically extending pins 26 which are arranged one in front and one in back of the pin 25. These pins are provided for the purpose of preventing the accidental longitudinal displacement of the pin 25 and also serve to maintain the followers in alignment with each other.

The outer end of the follower 23 is made of greater diameter than the lower end so as to form an annular shoulder 27 which is adapted to engage with a corresponding shoulder 28 carried by the casing for limiting downward movement of the follower. The outer end of the follower 24 is similarly constructed to form a shoulder 29 which is adapted to engage with a corresponding shoulder 30, carried by the casing, for limiting upward movement of the follower. By reason of this construction and as will hereinafter more fully appear excessive movement of either follower by the other will be prevented at all times.

Operatively engaging the upper end of the follower 23 is a horizontally disposed flexible diaphragm 31 which is clamped in place by a cap member 32 which is secured to the casing of the device in any desired manner. At the upper side of this diaphragm there is a chamber 33 which is in constant open communication through a passage 34 with a suitable control conduit 35 leading to the operator's brake valve device 36. The chamber 33 is connected through a passage 37 to a chamber 38 which contains a control valve 39 which is normally held seated by a spring 40 to close communication through the passage. The valve is provided with a fluted stem 41 adapted to be operatively engaged by a follower 42 contained in the chamber 33, which follower is in operative engagement with the flexible diaphragm and which is maintained in such engagement by a spring 43.

Operatively engaging the outer end of the follower 24 is a horizontally disposed flexible diaphragm 44 which is clamped in place by a cap member 45 secured to the casing. At the lower side of this diaphragm there is a chamber 46 which is in constant open communication through a passage 47 with the passage 33 connected to the control conduit 34. The chamber 46 is connected through a passage 48 to a chamber 49 which contains a control valve 50 which is normally held seated by a spring 51 to close communication through the passage. This valve is provided with a fluted stem 52 which is adapted to be operatively engaged by a follower 53 contained in the chamber 46, which follower is in operative engagement with the flexible diaphragm, and which is maintained in such engagement by a spring 54. The valve chamber 49 is in constant open communication through passages and pipe 55 with the valve chamber 38.

It will here be noted that the flexible diaphragm 44 is of less diameter than the diaphragm 31 for reasons which will hereinafter more fully appear and it will also be noted that the spring 54 is considerably heavier than the spring 43 since it must normally support the dead weight transmitted to the valve mechanism by the inner ends of the brake carrier 15.

The brake cylinder 20 may comprise the usual piston 56 having a hollow piston rod 57 which extends through a central opening in the non-pressure head 58 of the brake cylinder. At one side of the piston there is the usual pressure chamber 59 which is connected through a passage 60 to the passage 47, and at the other side of the piston there is a pressure chamber 61 which is constantly connected through a passage and pipe 62 to the valve chamber 38 of the control valve device and which is adapted to be connected to the atmosphere through a passage 63 in the piston, past a normally unseated ball shaped valve 64, the interior of the piston rod and ports 65 in the rod. The ball valve 64 forms the inner end of a push rod 66 contained in the piston rod. Beyond the end of the piston rod the outer end of the push rod is operatively connected to the upper end portion of the vertically disposed brake cylinder lever 67 which is operatively connected intermediate its ends to the brake shoes 12 and which is supported from the brake carrier 15 by means of hangers 68.

Interposed between and operatively engaging the outer end of the piston rod 57 and an adjacent shoulder 69 formed on the push rod 66 is a spring 70 which as shown is adapted to normally maintain the ball valve 64 in its unseated or release position against a stop pin 71 secured to the hollow piston rod.

The brake cylinder is also provided with the usual release spring 72 which normally maintains the brake cylinder piston in its release position and which acts to return the piston to its release position when releasing an application of the brakes.

The brake shoes 13 are hung from the brake carrier 15 by means of a hanger lever 73 which lever, at its lower end, is operatively connected to the lower end of the brake cylinder lever 67 by a longitudinally extending connecting rod 74. The connection between the connecting rod and the brake cylinder lever, in the present embodiment of the invention, is made through the medium of a slack adjuster 75 carried by the connecting rod.

The slack adjuster 75 may be of any conventional type having a movable cross head 76 which is operatively connected to the lower end of the brake cylinder lever and which may be actuated by a screw mechanism 77 adapted to be manually operated through the medium of an adjusting nut 78.

The upper end of the brake cylinder lever 67 extends between the side pieces 19 of the brake carrier 15, and above the carrier has a hand brake chain 79 operatively connected thereto, which chain is adapted to be actuated through the medium of the usual manually operable brake mast (not shown).

With the brake cylinder 20 devoid of fluid under pressure the brake rigging will be in release position as shown in the drawings and will be maintained in this position by the force of gravity or by a release spring when such a spring is employed. In this position the dead weight of the brake rigging which is transmitted to the brake carrier 15 will be carried by the springs 18 and 54 upon which the carrier rests. From this it will be apparent that when the brake rigging is in release position these springs will maintain the member in its normal position in which the associated brake shoes 14 are out of contact with the adjacent brake drum.

*Application of the brakes*

When it is desired to effect an application of the brakes, fluid under pressure is admitted to the conduit 35 and thereby to the brake cylinder piston chamber 59, diaphragm chambers 33 and 46 of the control valve device. In the present embodiment of the invention this is accomplished by the operator manipulating the handle of the brake valve device 36 to application position so as to connect a supply reservoir 80 to the conduit 35.

In response to the pressure of fluid thus admitted to the brake cylinder piston chamber 59, the brake cylinder piston 56 moves forwardly, first engaging the ball valve and thereby cutting off the atmospheric communication from the brake cylinder chamber 61 to the atmosphere and then actuating the push rod 66 and thereby the upper end of the brake cylinder lever 67 forwardly so as to move the brake shoes 12 into braking engagement with the brake drum. The brake cylinder lever as it is thus actuated acts through the medium of the slack adjuster 75 and connecting rod 74 to actuate the hanger lever 73 to move the brake shoes 13 into braking engagement with the brake drum.

In response to the pressure of fluid admitted to the diaphragm chamber 33, the diaphragm 31 flexes downwardly and thereby moves the follower 23, pin 25, pins 26, follower 24, diaphragm 44 and follower 53 as a unit in the same direction against the opposite pressure of fluid in diaphragm chamber 46 and spring 54 until such time as the follower 23 is brought to a stop by the interengagement of the shoulders 27 and 28 of the casing and follower 23, respectively. It should here be mentioned that this downward movement of the follower 53 will not be great enough to unseat the exhaust valve 50.

With the brake shoes 12 and 13 in engagement with the brake drum, the increasing force being applied to the brake shoes through the operation of the brake cylinder causes the shoes to move downwardly along the peripheral surface of the drum. This downward movement is due to the location of the shoes below the horizontal center line of the brake drum and to the application of the braking force to the shoes in a direction substantially parallel to the horizontal center line of the drum. The downwardly directed forces, due to such action being transmitted through the brake cylinder lever 67, hangers 67 and hanger lever 73 to the brake carrier 15, causing the carrier to move downwardly about the pin 25 and against the opposing action of the spring 18 until such time as the brake elements 14 engage the drum. At this time downward movement of the brake carrier and the brake rigging will stop since the carrier will now be supported by both the truck frame and the follower 24 subject to the upwardly directed force of the diaphragm 44.

With the wheel and axle assembly rotating in the direction indicated by the arrow in Fig. 2, the drag of the brake drum 10 on the brake shoes 13 at the front end of the truck will cause a further downwardly directed pull to be applied to the hanger lever 73 and thereby to the outer end of the associated carrier 15, thus augmenting the force with which the brake shoes are pressed against the exterior braking surfaces of the brake drum. The drag of the brake drum on the brake shoes 12 at this end of the truck has a tendency to move these shoes upwardly but this tendency is overbalanced by the downward force set up by the shoes as they tend to move downwardly along the braking surfaces of the drum under the influence of the force of the brake cylinder applied to the upper end of the brake cylinder or live lever 67. In other words, the force applied to the outer end of the carrier 15 through the medium of the hanger lever 73 is the sum of the downwardly directed force produced by the action of the shoes 13 under the influence of brake cylinder force and the force produced by the downward drag of the brake drum on these shoes, while the force applied to the carrier 15 through the medium of the hangers 68 is that produced by the brake shoes 12 under the influence of the brake cylinder force minus the force due to the upward drag of the brake drum on the shoes 12. From this it will be apparent that the downward pull of the brake shoes 13 at the leading side of the brake drum will exceed the downward pull of the brake shoes 12 at the other side of the drum. At the other or rear end of the truck the downward pull of the brake shoes 12 and 13 on the carrier 15 is just reverse of that of the shoes at the front end of the truck since the disposition of the shoes 12 and 13 with respect to the leading and other side of the brake drum is the reverse of that at the front end.

It will here be noted that at the front end of the truck the greater pull of the brake shoes at the leading side of the brake drum is transmitted to the outer end of the carrier 15 while at the rear end of the truck the corresponding pull of the brake shoes at the leading side is applied to the carrier 15 intermediate its ends. As a result of this the brake shoes 14 at the front end of the truck will be applied with greater force to the brake drum than will the corresponding brake shoes at the rear end of the truck.

It will be evident that with the brakes applied the carrier 15 will tend to rotate with the wheel and axle assembly so that the carrier at the front end of the truck will exert an upwardly directed force on its pivot pin 25 and the carrier at the rear end of the truck will exert a lesser downwardly directed force on its pivot pin.

Now when the torque transmitted through the medium of the brake shoes 12 and 13 and brake levers 67 and 73 to the carrier 15 becomes great enough to overcome the opposing pressure of the spring 43 and of fluid at control pipe or brake cylinder pressure acting on the flexible diaphragm 31, the carrier acts to move the pin 25, follower 23, diaphragm 31, follower 42 and valve 39 upwardly thus unseating the valve.

With the valve 39 thus unseated fluid under pressure flows from the brake cylinder chamber 59 and diaphragm chamber 33 past the open valve 39 and through pipe 62 to the chamber 61 of the brake cylinder. This flow of fluid from chambers 59 and 33 of course effects a reduction in the pressures in these chambers and the flow of fluid therefrom to the chamber 61 increases the pressure in this chamber, all of which serves to reduce the effective force of the piston on the brake cylinder lever 67 and consequently on the associated lever 73 and brake shoes 12, 13 and 14.

If, when the effective force of the brake cylinder has been thus reduced, the torque transmitted to the carrier 15 is no longer great enough to preponderate over the opposing downwardly directed force of the diaphragm 31 acting under the influence of the pressure of fluid in chamber 33 and the pressure of the spring 43, the diaphragm 31 flexes downwardly, causing the follower 23, pin 25 and inner ends of the carrier to move in the same direction until such time as these parts are brought to a stop by the interengagement of the shoulders 27 and 28 of the follower 23 and casing, respectively.

As the diaphragm 31 is flexing downwardly the spring 43 acts to move the follower 42 in the same direction, so that the spring 40 acts to seat the valve 39, thus cutting off the flow of fluid from the brake cylinder chamber 59 and diaphragm chamber 33 to the chamber 61 of the brake cylinder.

Now, if due to the reduction in the rotative speed of the wheel and axle assembly, the torque on the mechanism again becomes great enough to overcome the downwardly directed force of the diaphragm 31, the valve 39 will be again unseated and thereby permit fluid under pressure to flow from the chambers 59 and 33 to the chamber 61 of the brake cylinder, thus further reducing the brake cylinder force applied to the brake cylinder lever 67 and associated parts of the brake mechanism.

When the wheel and axle assembly is rotating in the direction opposite to that indicated by the arrow in Fig. 2 as would be the case if the wheel and axle assembly shown is at the rear or trailing end of the truck, the torque transmitted from the brake drum to the carrier 15 will, as has hereinbefore been described, be less than when the assembly is rotating in the direction indicated by the arrow. This torque is directed downwardly on the pin 25 and is resisted by the opposing upwardly directed force of the small diaphragm 44 acting under the influence of control pipe or brake cylinder chamber pressure and the pressure of the spring 54.

When the torque transmitted through the carrier 15, pin 25 and follower 24 becomes great enough to overcome the opposing force of the flexible diaphragm 44 the ends of the carrier will cause the pin 25, follower 24, diaphragm 44 and follower 53 to move downwardly, the follower 53 engaging the valve stem 52 and forcing the valve 50 from its seat against the opposing force of the light spring 51. Fluid under pressure now flows from the brake cylinder chamber 59 and diaphragm chamber 46 past the open valve 50, passages and pipe 55, chamber 38 and passage and pipe 62 to the chamber 61 of the brake cylinder. The pressure of fluid admitted to chamber 61 and the reduction in the pressure of fluid in the brake cylinder chamber 59 due to the flow of fluid therefrom to chamber 61 contribute to reduce the effective force of the brake cylinder applied to the brake cylinder lever 67 and associated parts of the brake mechanism.

It will here be understood that both the control means for the valves 39 and 50 operate in substantially the same manner to control the effective force of the brake cylinder although the control means for the valve 50 will, due to the diaphragm 44 being of less area than the diaphragm 31, respond to a lesser torque than will the control means for the valve 39 to reduce the effective force of the brake cylinder on the lever 67.

When the vehicle is in motion and an application of the brakes is initiated, the momentum of the body of the vehicle has a tendency to tilt the trucks forwardly with the result that the adhesion between the rear truck wheels and the track rail will be unintentionally decreased so that these wheels will have a greater tendency to slide on the rails than will the front truck wheels.

With this in mind the brake mechanism disclosed in the drawings has been so designed that the total braking force of the three pairs of brake shoes on the rear wheels of the truck for a chosen brake cylinder pressure will be less than that of the corresponding brake shoes on the front wheels, thereby lessening the tendency of the rear wheels to slide on the track rails. In this connection it will be understood that the mechanism employed for controlling the effective force of the brake cylinder in accordance with control pipe or brake cylinder pressure and the torque transmitted to the brake shoes 12 and 13 will, at all times, provide the proper braking force for the brake shoes of each wheel and axle assembly.

*Release of the brakes*

When it is desired to release the brakes fluid under pressure is vented from the brake cylinder chamber 59, which venting, in the present embodiment of the invention is accomplished through the brake valve device 36 which operated to release position by means of the operating handle 81. With the brake valve handle in release position fluid under pressure is released from the chamber 59 to the atmosphere by way of passage 60, passage 34, conduit 35, the brake valve device and a brake valve device exhaust port or conduit 82.

When the chamber 59 is thus vented, the force of the brake cylinder release spring 72 and the pressure of fluid trapped in the brake cylinder chamber 61 causes the brake cylinder piston 56 and piston rod 57 to move inwardly to their normal release position. As the piston thus moves the force of gravity causes the brake shoes 12 and 13 and the several parts of the brake mechanism associated therewith to assume their normal release positions as shown in Fig. 2.

It will here be noted that as the brake shoes 12 and 13 move out of contact with the brake drum 10 the compressed spring 18 acts to raise the outer end of the brake carrier 15, thereby moving the brake shoes 14 out of engagement with the drum, the upward movement of the carrier being limited by the engagement of spring seat 83 with the underside of the head 84 of a vertically disposed adjusting bolt 85 and by the engagement of an adjusting nut 86 on the bolt with the outer surface of the bottom wall of the spring pocket 17.

As the brake cylinder piston is nearing its normal release position the spring 70 acts to stop the further release movement of the brake cylinder push rod 70, so that upon the final release movement of the piston, the valve seat carried by the piston is moved out of engagement with the ball valve 64 forming the inner end of the push rod, thus establishing communication between the passage 63 and thereby the chamber 61 to the interior of the hollow piston rod 57, and since the interior of the piston rod is connected through the ports 65 with the atmosphere fluid under pressure in chamber 61 is exhausted to the atmosphere.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake mechanism for a railway vehicle, in combination, a brake element operative to exert a braking force on a wheel of the vehicle, a brake cylinder having a piston for actuating said element and also having two chambers located respectively at opposite sides of the piston, means for admitting fluid under pressure to one of said chambers to effect the operation of said piston to actuate said element to its braking position, and means controlled in accordance with the relation of the pressure of fluid in said chamber and the torque on said element due to braking for supplying fluid under pressure to the other of said chambers.

2. In a brake mechanism for a railway vehicle, in combination, a brake element operative to exert a braking force on a wheel of the vehicle, a brake cylinder having a piston for actuating said element and also having two chambers located respectively at opposite sides of the piston, means for admitting fluid under pressure to one of said chambers to effect the operation of said piston to actuate said element to its braking position, and valve means controlled in accordance with the relation of the pressure of fluid in said chamber and the torque on said element due to braking for admitting fluid under pressure from said chamber to the other of said chambers.

3. In a brake mechanism for a railway vehicle, in combination, a brake element operative to exert a braking force on a wheel of the vehicle, a brake cylinder having a piston for actuating said elements and also having two chambers respectively at opposite sides of the piston, means for admitting fluid under pressure to one of said chambers to effect the operation of said piston to actuate said element to its braking position, and means controlled in accordance with the relation of the pressure of fluid in said chamber and the torque on said element due to braking for reducing the pressure in said chamber and increasing the pressure in the other of said chambers.

4. In a brake mechanism for a railway vehicle, in combination, a brake element operative to exert a braking force on a wheel of the vehicle, a brake cylinder having a piston for actuating said element and also having two chambers located respectively at opposite sides of the piston, a control device for admitting fluid under pressure to one of said chambers to effect the operation of said piston to actuate said element to its braking position, and means controlled in accordance with the relation of the pressure of fluid in said chamber and the torque on said element due to braking for reducing the pressure of fluid in said chamber and thereby the pressure of fluid acting on said means in opposition to the torque on said element acting on the means and for increasing the pressure of fluid in said other chamber.

5. In a brake mechanism for a railway vehicle, in combination, a brake element operative to exert a braking force on a wheel of the vehicle, a brake cylinder having a piston for actuating said element and also having two chambers located respectively at opposite sides of the piston, means for admitting fluid under pressure to one of said chambers to effect the operation of said piston to actuate said element to its braking position, said chamber being chargeable with fluid at different pressures corresponding to a selected degree of brake application, and means controlled in accordance with the relation of the pressure of fluid in said chamber and the torque on said element due to braking for supplying fluid under pressure to the other of said chambers.

6. In a brake mechanism for a railway vehicle, in combination, a brake element operative to exert a braking force on a wheel of the vehicle, a brake cylinder having a piston for actuating said element and also having two chambers located respectively at opposite sides of the piston, a normally open atmospheric communication from one of said chambers, means adapted to close said communication upon movement of said piston toward its brake applying position, means for admitting fluid under pressure to the other of said chambers to effect movement of the piston to its brake applying position, and means controlled in accordance with the relation of the pressure of fluid in said other chamber and the torque on said element due to braking for supplying fluid under pressure to the first mentioned chamber.

7. In a brake mechanism for a railway vehicle truck, in combination, a brake element operative to exert a braking force on a wheel of the vehicle, a brake cylinder having a piston for actuating said element and also having two chambers respectively at opposite sides of the piston, a hollow piston rod carried by said piston, the interior of said piston rod being normally open through a communication to the atmosphere and through another communication to one of said chambers, a push rod movably mounted in said hollow piston rod adapted to be operated by said piston to actuate said element to its brake applying position, a valve carried by said push rod adapted to be engaged by said piston to close the communication from said chamber to the interior of the piston rod upon movement of the piston in applying the brakes, means for admitting fluid under pressure to the other of said chambers to effect movement of the piston in brake applying direction, and means controlled in accordance with the relation of the pressure of fluid in said other chamber and the torque on said element due to braking for supplying fluid under pressure to the chamber at the opposite side of the piston.

8. In a brake mechanism for a railway vehicle truck, in combination, a braking surface carried by and rotatable with a wheel and axle assembly of the truck, clasp arranged brake elements movable into braking engagement with said braking surface, mechanism for actuating said brake elements, another brake element movable into engagement with said braking surface by the clasp arranged brake elements when the clasp arranged brake elements are moved into engagement with the braking surface, and means controlled in response to the relation of the torque of at least one of the brake elements and a torque opposing force which is proportional to the force applied to said means for controlling the force applied to said mechanism.

9. In a brake mechanism for a railway vehicle truck, in combination, a braking surface carried by and rotatable with a wheel and axle assembly of the truck, clasp arranged brake elements movable into braking engagement with said braking surface, mechanism for actuating said brake elements, another brake element movable into engagement with said braking surface by the clasp arranged brake elements when the clasp arranged brake elements are moved into engagement with the braking surface, and means subject to the torque on at least one of the brake elements and an opposing force and operable in response to an increase in the torque over that of the opposing force for controlling the force applied to said mechanism.

10. In a brake mechanism for a railway vehicle truck, in combination, a braking surface carried by and rotatable with the wheel and axle assembly of the truck, clasp arranged brake elements movable into braking engagement with said braking surface, mechanism for actuating said brake elements, another brake element movable into engagement with said braking surface by the clasp arranged brake elements when the clasp arranged brake elements are moved into engagement with the braking surface, and means subject to the torque on at least one of the brake elements and an opposing force and operable in response to an increase in the torque over that of the opposing force for decreasing the force applied to said mechanism.

11. In a brake mechanism for a railway vehicle truck, in combination, a braking surface carried by and rotatable with a wheel and axle assembly of the truck, clasp arranged brake elements movable into braking engagement with said braking surface, mechanism for actuating said brake elements, another brake element movable into engagement with said braking surface by the clasp arranged brake elements when the clasp arranged brake elements are moved into engagement with the braking surface, and means subject to the torque on at least one of the brake elements and an opposing force which is variable according to different chosen degrees of braking and operable when said torque exceeds said opposing force for decreasing the force applied to said mechanism.

12. In a brake mechanism for a railway vehicle truck, in combination, a braking surface carried by and rotatable with a wheel and axle assembly of the truck, clasp arranged brake elements movable into braking engagement with said braking surface, a brake cylinder adapted to be operated by fluid under pressure for actuating said clasp arranged brake elements, means for admitting fluid under pressure to the brake cylinder, another brake element movable into engagement with said braking surface by the clasp arranged brake elements when the clasp arranged brake elements are moved into engagement with the braking surface, means subject to the torque on at least one of the brake elements and an opposing force created by a fluid pressure equal to brake cylinder pressure, and operable in response to an increase in the torque over that of the opposing force for reducing the braking applying force of the brake cylinder.

13. In a brake mechanism for a railway vehicle truck, in combination, a braking surface carried by and rotatable with a wheel and axle assembly of the truck, clasp arranged brake elements movable into braking engagement with said braking surface, a brake cylinder adapted to be operated by fluid under pressure for actuating said clasp arranged brake elements, means for admitting fluid under pressure to the brake cylinder, a movable abutment subject on one side to the torque on at least one of the brake elements and subject on the other side to the pressure of fluid in the brake cylinder and operable in one direction when the torque acting on one side of the abutment is great enough to overcome the pressure of fluid on the other side of the abutment, and operable in the opposite direction when the pressure of fluid acting on the movable abutment overcomes the torque acting in opposition thereto, and means controlled by said abutment for regulating the brake applying force of the brake cylinder.

14. In a brake mechanism for a railway vehicle truck, in combination, a braking surface carried by and rotatable with the wheel and axle assembly of the truck, clasp arranged brake elements movable into braking engagement with said braking surface, a brake cylinder having a piston adapted to be operated by fluid under pressure for actuating said clasp arranged brake elements, means for admitting fluid under pressure to one side of said piston, a valve casing secured to the frame of the truck, valve means mounted in said casing adapted to be operated to admit fluid under pressure to the other side of said piston to reduce the braking force of the brake cylinder, another brake element pivotally connected at one end to said valve means and being operable by the clasp arranged brake elements into engagement with said braking surface when the clasp arranged brake elements are moved into braking engagement with the braking surface, said end of said other brake element being responsive to the torque on the element to actuate said valve means, and means for yieldably opposing the operation of said valve means with a force which varies in accordance with variations in the pressure of fluid admitted to the first mentioned side of said piston.

15. In a brake mechanism for a railway vehicle truck, in combination, a braking surface carried by and rotatable with a wheel and axle assembly of the truck, clasp arranged brake elements movable into braking engagement with said braking surface, a brake cylinder having a piston adapted to be operated by fluid under pressure for actuating said clasp arranged brake elements, means for admitting fluid under pressure to one side of the brake cylinder piston, a valve casing secured to the frame of the truck, valve means mounted in said casing adapted to be operated to admit fluid under pressure to the other side of said piston to reduce the braking force to the brake cylinder, another brake element pivotally connected at one end to said valve means and being operable by the clasp arranged brake elements into engagement with said braking surface when the clasp arranged brake elements are moved into braking engagement with the braking surface, said end of said other brake element being responsive to the torque on the element to actuate said valve means to reduce the braking force of the brake cylinder, and means for yieldably opposing the operation of said valve means with a force which varies in accordance with variation of the pressure of fluid admitted to the first mentioned side of said piston and for returning said end of the element to its normal position when the torque thereon becomes less than that of the opposing force, and means for actuating said valve means to cut off the flow of fluid to said other side of the piston on the return of said end of the brake element to its normal position.

16. The combination of a railway vehicle truck brake rigging comprising a braking surface rotatable with a wheel and axle assembly of the truck, a pair of clasp arranged brake elements movable into braking engagement with said surface, another brake element supporting said clasp arranged brake elements from the frame of the truck and operative relative to said frame into engagement with said braking surface by said clasp arranged brake elements when the clasp arranged brake elements are moved into braking engagement with the braking surface, a brake cylinder operable by fluid under pressure to actuate said clasp arranged brake elements, means operable to decrease the braking force of the brake cylinder, and means normally supporting one end of said other brake element and being operable to actuate the first mentioned means to decrease the braking force of the brake cylinder when certain forces set up in braking and transmitted to said brake element exceed an opposing force which varies according to variations in the pressure of fluid in the brake cylinder.

17. The combination of the railway vehicle truck brake rigging comprising a braking surface rotatable with the wheel and axle assembly of the truck, a pair of clasp arranged brake elements movable into braking engagement with said surface, a brake cylinder operative by fluid under pressure to actuate said brake elements, means carried by the truck frame operative to reduce the braking force of the brake cylinder, and another brake element pivotally connected to said means and being rockable about its pivot by said clasp arranged brake elements into engagement with said braking surface when the clasp arranged brake elements are moved into braking engagement with the brake surface, said means being subject to the torque on said other brake element and a force acting in opposition to the torque, and being operable by said other brake element when the torque thereon exceeds the opposing force.

18. In a brake mechanism for a railway vehicle truck, in combination, a braking surface carried by and rotatable with a wheel and axle assembly of the truck, a pair of clasp arranged brake elements movable into braking engagement with said surface, a member movably carried by the truck frame for vertical movement relative thereto and supporting said brake element, another brake element carried by said member movable thereby into engagement with said surface in response to forces set up due to the engagement of the clasped arranged brake elements with said surface, said member being also movable in response to rotary movement of at least one of the brake elements in the direction of rotation of said element under the influence of the friction between the element and braking surface, and means responsive to the last mentioned movement of the member for varying the force with which the brake elements are pressed into engagement with said surface.

19. In a brake mechanism for a railway vehicle truck, in combination, a braking surface carried by and rotatable with a wheel and axle assembly of the truck, clasp arranged brake elements movable into braking engagement with said braking surface, mechanism for actuating said brake elements, and control means subject to the torque of said surface on the mechanism and a torque opposing force which is proportional to the actuating force of the mechanism and operative when the torque on the mechanism exceeds the torque opposing force for decreasing the actuating force of the mechanism, said control means comprising another brake element which is movable by the clasp arranged brake elements into braking engagement with said surface and to which, when in braking engagement, the torque on the mechanism is applied.

20. In a brake mechanism for a railway vehicle truck having a truck frame and a truck frame supporting wheel and axle assembly, in combination, a braking surface carried by and rotatable with said wheel and axle assembly, a clasp brake mechanism operative into braking engagement with said surface, said clasp brake mechanism being movable downwardly when in braking engagement with the surface in response to the forces set up due to the braking action between the mechanism and surface, supporting means for said clasp brake mechanism carried by said truck frame, said supporting means comprising a member movable relative to the truck frame by said clasp brake mechanism into braking engagement with said surface, and being also movable relative to the truck frame in response to the torque on said mechanism when in such engagement, means carried by the truck frame operative to actuate said clasp brake mechanism, control means carried by the truck frame and operative by said member upon movement thereof in response to torque for decreasing the effective force of the actuating means, and means included in the control means subject to a force which varies with variations in the force of said actuating means for opposing the torque on said member.

21. In a brake mechanism for a railway vehicle truck having a truck frame and a truck frame supporting wheel and axle assembly, in combination, a braking surface carried by and rotatable with said wheel and axle assembly, a clasp brake mechanism operative into braking engagement with said surface, said clasp brake mechanism being movable downwardly when in braking engagement with the drum in response to the forces set up due to the braking action between the mechanism and surface, supporting means for said clasp brake mechanism carried by said truck frame, said supporting means comprising a member movable relative to the truck frame by said clasp brake mechanism into braking engagement with said surface, and being also movable relative to the truck frame in response to the torque on said mechanism when in such engagement, means carried by the truck frame operative by fluid under pressure to actuate said clasp brake mechanism, control means carried by the truck frame and operative by said member upon movement thereof in response to torque for decreasing the effective force of the actuating means, and means included in said control means subject to the pressure of fluid for operating the actuating means for yieldably opposing movement of the member in response to torque.

22. In a brake mechanism for a wheel and axle assembly of a railway vehicle truck, in combination, a braking surface rotatable by said wheel and axle assembly, a brake mechanism movable into braking engagement with said surface, a brake cylinder operative by fluid under pressure to actuate said brake mechanism, said brake mechanism being so constructed and arranged as to provide a greater degree of braking pressure on said surface and thereby the torque on the mechanisms when the wheel and axle assembly is rotating in one direction than when rotating in the opposite direction for the same brake cylinder pressure, and means controlled according to the different torque produced by the rotation of the wheel and axle assembly in the different directions while the brakes are applied for decreasing, in each instance, the effective force of the brake cylinder.

23. In a brake mechanism for a wheel and axle assembly of a railway vehicle truck, in combination, a braking surface rotatable by said wheel and axle assembly, a brake mechanism movable into braking engagement with said surface, a brake cylinder operative by fluid under pressure to actuate said brake mechanism, said brake mechanism being so constructed and arranged as to provide a greater degree of braking pressure on said surface and thereby the torque on the mechanisms when the wheel and axle assembly is rotating in one direction than when rotating in the opposite direction for the same brake cylinder pressure, means responsive to a certain torque produced upon braking the wheel and axle assembly while rotating in one direction for decreasing the effective force of the brake cylinder, and means responsive to a certain lesser torque produced upon braking the wheel and axle assembly while rotating in the opposite direction for decreasing the effective force of the brake cylinder.

24. In a brake mechanism for a wheel and axle assembly of a railway vehicle truck, in combination, a braking surface rotatable by said wheel and axle assembly, a brake mechanism movable into braking engagement with said surface, a brake cylinder operative by fluid under pressure to actuate said brake mechanism, said brake mechanism being so constructed and arranged as to provide a greater degree of braking pressure on said surface and thereby the torque on the mechanism when the wheel and axle assembly is rotating in one direction than when rotating in the opposite direction for the same brake cylinder pressure, and a control mechanism responsive to a certain torque produced upon braking the wheel and axle assembly while rotating in one direction for decreasing the effective force of the brake cylinder and responsive to a certain lesser torque produced upon braking the wheel and axle assembly while rotating in the opposite direction for decreasing the effective force of the brake cylinder.

25. In a brake mechanism for a wheel and axle assembly of a railway vehicle truck, in combination, a braking surface rotatable by said wheel and axle assembly, a brake mechanism movable into braking engagement with said surface, a brake cylinder operative by fluid under pressure to actuate said brake mechanism, said brake mechanism being so constructed and arranged as to provide a greater degree of braking pressure on said surface and thereby the torque on the mechanism when the wheel and axle assembly is rotating in one direction than when rotating in the opposite direction for the same brake cylinder pressure, means subject to the pressure of brake cylinder fluid and responsive to torque of a certain magnitude produced upon braking the wheel and axle assembly while rotating in one direction when the torque is in excess of the force produced by the pressure of the brake cylinder fluid, for decreasing the effective force of the brake cylinder, and means subject to the pressure of brake cylinder fluid and responsive to torque of a lesser magnitude produced upon braking the wheel and axle assembly while rotating in the opposite direction when the torque is in excess of the force produced by the pressure of the brake cylinder fluid for decreasing the effective force of the brake cylinder.

26. In a railway vehicle wheel and axle assembly brake mechanism of the type having a braking surface rotatable with the wheel and axle assembly, clasp arranged brake shoes movable into braking engagement with said surface, means operative to actuate said brake elements, another brake element, and a pivotally mounted brake carrier for carrying all of said brake elements and movable by said clasp arranged elements when the clasp arranged elements engage said surface for actuating said carrier to move said other brake element into braking engagement with said surface, in combination, means operative to effect a decrease in the effective braking force of the first mentioned means, and means operative in response to the torque on said carrier for actuating the second mentioned means.

27. In a railway vehicle wheel and axle assembly brake mechanism of the type having a braking surface rotatable with the wheel and axle assembly, clasp arranged brake shoes movable into braking engagement with said surface, means operative to actuate said brake elements, another brake element, and a pivotally mounted brake carrier for carrying all of said brake elements and movable by said clasp arranged elements when the clasp arranged elements engage said surface for actuating said carrier to move said other brake element into braking engagement with said surface, in combination, means operative to effect a decrease in the effective braking force of the first mentioned means, and means subject to the torque on said carrier and a torque opposing force which is variable with variations in the force for actuating the first mentioned means, and operative by said carrier, when the torque thereon exceeds the opposing force, for actuating the second mentioned means.

28. In a brake mechanism for a railway vehicle wheel and axle assembly, in combination, a braking surface rotatable by said wheel and axle assembly, a brake element movable into braking engagement with said surface, means for actuating said brake element, apparatus operative to control the force with which said brake element is pressed into engagement with said surface, and friction means movable into engagement with said surface by said brake element when the brake element is in engagement with said surface, said friction means being so constructed and arranged as to respond to torque of the assembly in braking for actuating said control apparatus.

29. In a brake mechanism for a railway vehicle wheel and axle assembly, in combination, a braking surface rotatable by said wheel and axle assembly, a brake element movable into braking engagement with said surface, means for actuating said brake element, apparatus operative to control the force with which said brake element is pressed into engagement with said surface, and friction means movable into engagement with said surface by said brake element when the brake element is in engagement with said surface, said friction means when in engagement with said surface being responsive to torque thereon due to braking for actuating said control apparatus.

30. In a brake mechanism for a railway vehicle wheel and axle assembly, in combination, a braking surface rotatable by said wheel and axle assembly, a brake element movable into braking engagement with said surface, means for actuating said brake element, apparatus operative to control the force with which said brake element is pressed into engagement with said surface, friction means movable into engagement with said surface by said brake element when the brake element is in engagement with said surface, said friction means being so constructed and arranged as to respond to torque of the assembly in braking for actuating said control apparatus, said control apparatus including means, subject to a force substantially equal to the force for actuating the brake element actuating means, for applying a torque opposing force to said friction means.

31. In a brake mechanism for a railway vehicle truck wheel and axle assembly, in combination, a mechanism for braking said assembly, a brake cylinder operative by fluid under pressure for actuating said mechanism, said mechanism being so constructed and arranged as to provide, for any given brake cylinder pressure, heavier braking when the wheel and axle assembly is rotating in one direction than when rotating in the opposite direction, and means responsive to torque of the assembly to decrease the effective force of the brake cylinder when the wheel and axle assembly is rotating in either direction, said means being so constructed and arranged as to be less sensitive to the torque of the assembly when the assembly is rotating in said one direction than when the assembly is rotating in said opposite direction.

32. In a brake mechanism for a railway vehicle truck wheel and axle assembly, in combination, mechanism operative for braking said assembly, said mechanism being so constructed and arranged as to provide, for any given actuating force, heavier braking of the assembly when the assembly is rotating in one direction than when rotating in the opposite direction, and means responsive to torque on the mechanism in braking for decreasing the braking force of the mechanism on the assembly, said means being so constructed and arranged with relation to the mechanism as to be less sensitive to the torque on said mechanism when the assembly is rotating in said one direction than when the assembly is rotating in the opposite direction.

33. In a brake mechanism for a railway vehicle truck wheel and axle assembly, in combination, mechanism operative for braking said assembly, said mechanism being so constructed and arranged as to provide, for any given actuating force, heavier braking of the assembly when the assembly is rotating in one direction than when rotating in the opposite direction, means responsive to the torque on the mechanism when the wheel and axle assembly is rotating in said one direction for decreasing the braking force of the mechanism, and means responsive to the torque on the mechanism when the wheel and axle assembly is rotating in said opposite direction, the first mentioned means being less sensitive to torque than the second mentioned means.

CARLTON D. STEWART.